United States Patent
Tanaka et al.

(10) Patent No.: US 9,825,505 B2
(45) Date of Patent: Nov. 21, 2017

(54) ROTOR OF ROTARY ELECTRIC MACHINE AND MANUFACTURING METHOD THEREOF

(71) Applicants: Kazunori Tanaka, Tokyo (JP); Ryuzo Morita, Tokyo (JP)

(72) Inventors: Kazunori Tanaka, Tokyo (JP); Ryuzo Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 146 days.

(21) Appl. No.: 14/422,904

(22) PCT Filed: Dec. 3, 2012

(86) PCT No.: PCT/JP2012/081237
§ 371 (c)(1),
(2) Date: Feb. 20, 2015

(87) PCT Pub. No.: WO2014/087461
PCT Pub. Date: Jun. 12, 2014

(65) Prior Publication Data
US 2015/0229181 A1    Aug. 13, 2015

(51) Int. Cl.
*H02K 21/24* (2006.01)
*H02K 21/12* (2006.01)
(Continued)

(52) U.S. Cl.
CPC ............... *H02K 7/04* (2013.01); *H02K 1/243* (2013.01); *H02K 3/28* (2013.01); *H02K 3/528* (2013.01)

(58) Field of Classification Search
CPC .................................. H02K 1/22; H02K 15/03
(Continued)

(56) References Cited

U.S. PATENT DOCUMENTS 5,229,672 A * 7/1993 Iwaki ....................... H02K 7/04
29/598
5,329,199 A    7/1994 Yockey et al.
(Continued)

FOREIGN PATENT DOCUMENTS

CN     202183653 U  *  4/2012
GB       2352093 A       1/2001
(Continued)

OTHER PUBLICATIONS

Machine translation CN202183653 (2012).*
(Continued)

*Primary Examiner* — Jose Gonzalez Quinones
(74) *Attorney, Agent, or Firm* — Sughrue Mion, PLLC; Richard C. Turner

(57) ABSTRACT

In a rotor of a rotary electric machine including a pair of gutter-shaped concave portions which are formed along a side surface positioned at the outside of an axis of field-magnet core components so as to install and protect a pair of lead wires, balance-correction concave portions formed by a molding die are provided at shoulders of claw-shaped magnetic poles being nearest to the gutter-shaped concave portions in claw-shaped magnetic poles arranged at positions which are evenly separated at least in a circumferential direction with respect to the pair of gutter-shaped concave portions.

5 Claims, 4 Drawing Sheets

(51) Int. Cl.
*H02K 7/04* (2006.01)
*H02K 1/24* (2006.01)
*H02K 3/52* (2006.01)
*H02K 3/28* (2006.01)

(58) Field of Classification Search
USPC ...... 310/51, 156.66, 156.69, 156.71, 156.73, 310/263
See application file for complete search history.

(56) References Cited

U.S. PATENT DOCUMENTS

| | | | | |
|---|---|---|---|---|
| 5,539,265 | A * | 7/1996 | Harris | H02K 3/528 310/194 |
| 6,172,434 | B1 | 1/2001 | Oohashi et al. | |
| 2002/0167233 | A1 | 11/2002 | Kondo | |
| 2003/0062787 | A1 | 4/2003 | Kobayashi | |
| 2004/0017128 | A1 * | 1/2004 | York | H02K 3/528 310/263 |
| 2007/0267938 | A1 | 11/2007 | Nishimura | |
| 2010/0072852 | A1 | 3/2010 | Nishimura | |
| 2010/0257723 | A1 * | 10/2010 | Gas | H02K 15/03 29/598 |
| 2012/0086304 | A1 * | 4/2012 | Eckert | H02K 1/243 310/263 |

FOREIGN PATENT DOCUMENTS

| | | |
|---|---|---|
| JP | 56-83986 U | 7/1981 |
| JP | 4-363346 A | 12/1992 |
| JP | 8-126272 A | 5/1996 |
| JP | 9-28063 A | 1/1997 |
| JP | 9-308151 A | 11/1997 |
| JP | 2002-58225 A | 2/2002 |
| JP | 2002-335661 A | 11/2002 |
| JP | 2003-180058 A | 6/2003 |
| JP | 2007-312485 A | 11/2007 |
| JP | 2010-252560 A | 11/2010 |
| WO | 2010/108797 A2 | 9/2010 |

OTHER PUBLICATIONS

Communication dated Sep. 1, 2015 from the Japanese Patent Office in counterpart application No. 2014-550811.
International Search Report for PCT/JP2012/081237 dated Feb. 12, 2013 [PCT/ISA/210].
Communication dated Jun. 24, 2016, from the European Patent Office in counterpart European Application No. 12889540.6.
Communication dated Jul. 18, 2016, from the State Intellectual Property Office of People's Republic of China in counterpart application No. 201280076202.3.
Communication dated Mar. 22, 2017, from the European Patent Office in counterpart European application No. 12 889 540.6.
Communication dated Jul. 13, 2017, from State Intellectual Property Office of the P.R.C. In counterpart application No. 201280076202.3.

* cited by examiner

ROTOR OF ROTARY ELECTRIC MACHINE AND MANUFACTURING METHOD THEREOF

CROSS REFERENCE TO RELATED APPLICATIONS

This application is a National Stage of International Application No. PCT/JP2012/081237, filed on Dec. 3, 2012, the contents of all of which are incorporated herein by reference in their entirety.

BACKGROUND OF THE INVENTION

Technical Field

The present invention relates to a rotor of a vehicular alternator which is mounted in a vehicular or the like and used as a rotary electric machine, and particularly relates to a claw-pole-type rotor and a manufacturing method of the rotor.

Background Art

In a general claw-pole-type rotor of a vehicular alternator, claws of first and second claw poles, which are extended from a base in a shaft direction, are alternately engaged and arranged, and it is required that this kind of rotor is balanced around a shaft after the rotor is assembled. In a conventional rotor, it is suggested that drill hole are formed in the claw poles in order to balance the rotor, and an imbalance of the rotor is corrected by partly removing a material of the claw poles.

For example, in Patent Document 1, there has been a submitted rotor in which a balance of the rotor is corrected, without damaging a fan, by a primary balance hole which is previously formed at a side surface positioned at the outside of an axis of a pole base, and by a secondary balance hole which is formed at a R-shaped claw base for connecting the base and the claw after the fan is fixed at a side surface positioned at the outside of an axis of a pole base.

Specifically, in a rotor of a vehicular alternator which is mounted in a vehicular, a vibration is transmitted from the vehicular even when the rotor is rotated, and if the imbalance of the rotor is large, a grating noise is enlarged, and durability and performance are reduced, so that it is required that the imbalance of the rotor is limited as small as possible.

On the other hands, in Patent Document 2, there has been a submitted rotor of a vehicular alternator in which, when a slip ling is connected to a lead wire of a field-magnet coil by a connecting terminal, the connecting terminal is installed in a gutter, which is formed on one end surface of a claw pole in a radius direction, so as to be molded, whereby a resistance to a vibration and a resistance to centrifugal force are improved (for example, refer to FIG. 3 in Patent Document 2).

CONVENTIONAL ART DOCUMENT

Patent Document

Patent Document 1: International Publication No. WO/2010/108797
Patent Document 2: Japanese Utility Model Publication No. S56-83986

SUMMARY OF THE INVENTION

Problems to be Solved by the Invention

In a conventional rotor described in Patent Document 1, before a fan is attached, a primary balance correction of a claw pole itself is performed by a primary balance hole which is formed at a side surface positioned at the outside of an axis of the pole, and after the fan is attached, a secondary balance correction is performed by a secondary balance hole. Therefore, two steps of processing work for balancing the rotor are needed, and a cleaning process for unnecessary processing oil and an attaching process are performed on each step, so that there has been a problem in that a manufacturing time cannot be reduced.

Moreover, in a case of a claw pole described in Patent Document 2, on which a gutter is formed at a side surface, a balance correction of the claw pole itself is essentially required. However, an effective method for maintaining a balance corresponding to a volume of the gutter is not described, so that a processing time, a processing depth, and a number of processes for the claw pole are increased, and the claw pole inevitably has a configuration in which an influence on a magnetic circuit is worried.

The object of the present invention is to perform a balance correction by a simple method to gutters, which are formed in a radius direction and cause one of unbalanced conditions, whereby it can be realized that processing steps are simplified, and then, a processing cost and a manufacturing time are reduced.

Means for Solving Problems

In order to solve the above-described problems, in a rotor of a rotary electric machine of the present invention, which includes a pair of gutter-shaped concave portions for installing and protecting a pair of lead wires along a side surface positioned at the outside of an axis of field-magnet core components, balance-correction concave portions formed by a molding die are provided at shoulders of the claw-shaped magnetic poles being nearest to positions which are evenly separated at least in a circumferential direction with respect to the pair of gutter-shaped concave portions.

Effects of the Invention

In the rotor of the rotary electric machine of the present invention, the field-magnet core components are formed by the molding die so as to correct the gutters which cause one of unbalanced conditions, so that a primary balance correction can be removed, and a processing time, a processing cost, and a manufacturing time can be reduced.

MODE FOR CARRYING OUT THE INVENTION

Embodiment 1

Figure 1:
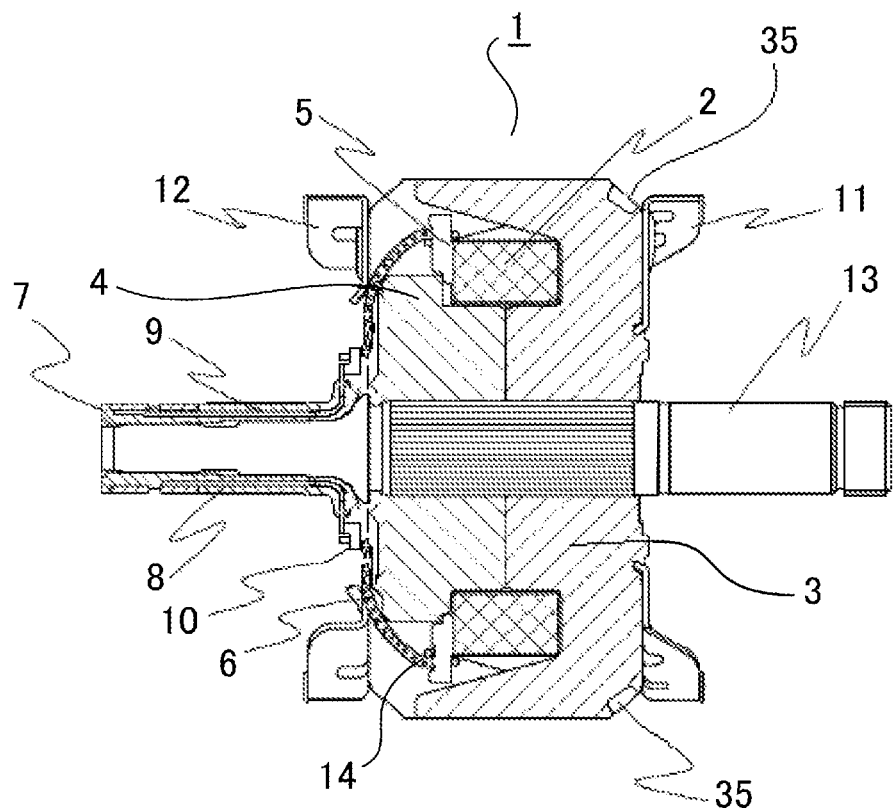
FIG. 1 is a cross-sectional view illustrating a rotor structure of a rotary electric machine according to Embodiment 1 of the present invention.

FIG. 1 is a cross-sectional view illustrating a rotor structure of a rotary electric machine according to Embodiment 1 of the present invention. A rotor 1 of the rotary electric machine includes a field-magnet coil 2 for generating a magnetic flux, and a field-magnet core which covers the field-magnet coil 2 and is composed of a first field-magnet core component 3 and a second field-magnet core component 4 each having claw-shaped magnetic poles (claw poles) which are set so as to be alternately engaged, and the field-magnet coil 2 is wound around an isolation bobbin 5. A slip ring assembly 7 is configured so as to supply electric current from the outside to two slip rings via brushes (not illustrated).

Figure 2:
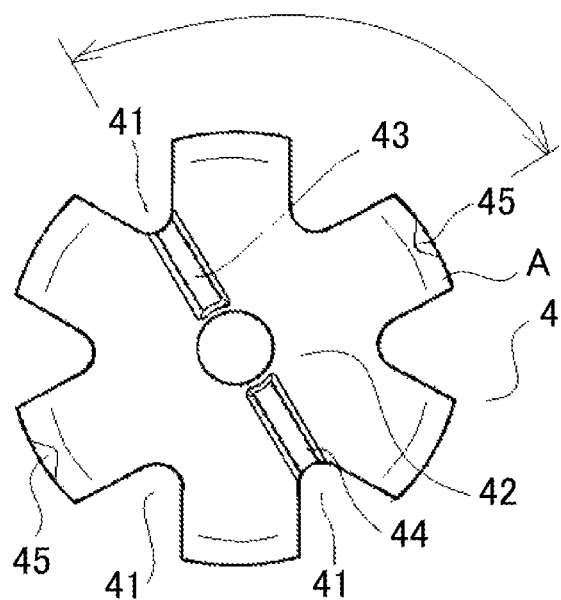
FIG. 2 is a side view of a field-magnet core component of a rotor illustrated in FIG. 1.

Lead wires 6, which are led from the field-magnet coil 2, are extended from lead wire latching portions 14, which are provided at a flange of the isolation bobbin 5, so as to be connected to the slip ring assembly 7. At this time, as illustrated in FIG. 2, the lead wires 6 are extended from valley-shaped portions 41, which are formed between the adjacent claw-shaped magnetic poles of the second field-magnet core component 4, to the outside along an outer end surface, so as to be connected to terminals 8 and 9, which compose the slip ring assembly 7, via lead wire connecting portions 10.

The lead wires 6 are arranged from the valley-shaped portions 41, which are formed between the adjacent claw-shaped magnetic poles, to the lead wire connecting portions 10, which are arranged around an outer circumference of a shaft 13, along a side surface positioned at the outside of an axis of the field-magnet core component 4, so that, in order to realize durability and reliability the lead wires 6, the lead wires 6 are configured in such a way that those are installed in gutter-shaped concave portions 43 and 44 (illustrated in FIG. 2), which are formed at a side surface 42 of the second field-magnet core component 4 at a rear side. The lead wires 6 are installed in the gutter-shaped concave portions 43 and 44, so that the extended lead wires 6 are roughly held, and the gutter-shaped concave portions 43 and 44 are used as guide portions when the lead wires 6 are electrically connected. The lead wires 6 correspond to a winding-start portion and a winding-end portion of the field-magnet coil 2, and in this case, the gutter-shaped concave portions 43 and 44 are diagonally arranged at two positions in a roughly diametrical direction.

The lead wires 6 are sandwiched at the lead wire connecting portions 10, and electrodes (not illustrated) are pressed toward both outer surfaces of the lead wires 6 by predetermined force so as to be energized, and insulating films of the lead wires 6 are melted by electrical resistance heat, whereby the lead wires 6 are electrically connected to the terminals 8 and 9. Moreover, cooling fans 11 and 12 are fixed to the rotor 1, and a shaft 13 for rotating the rotor 1 is provided.

Because the gutter-shaped concave portions 43 and 44, by which a volume of the field-magnet core component 4 is reduced, are arranged at two positions in the diametrical direction, if this condition is continued, an imbalance of the field-magnet core component 4 operated as a rotary component is caused. However, when the field-magnet core component 4 is molded, balance-correction concave portions 45 are concurrently formed by a molding die, for example, at positions which are evenly separated from the gutter-shaped concave portions 43 and 44 in a circumferential direction, in other words, at positions which are separated from the gutter-shaped concave portions 43 and 44 at a 90° angle, whereby the field-magnet core component 4 can be obtained in a condition where a balance of the molded form is previously improved. In a case of the field-magnet core component 4, a processing step can be deleted, and a manufacturing time can be reduced, and a cost can be more reduced in comparison with a conventional field-magnet core component in which drilled holes are formed at a side surface positioned at the outside of an axis of the field-magnet core component, and a balance of the field-magnet core component is corrected.

Figure 3:
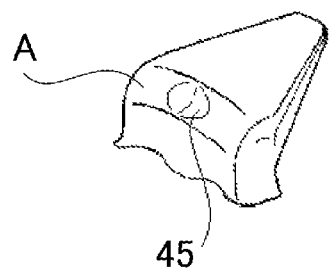
FIG. 3 is an enlarged oblique perspective view of a main portion, in which an example of a balance-correction concave portion is indicated.
Figure 5:
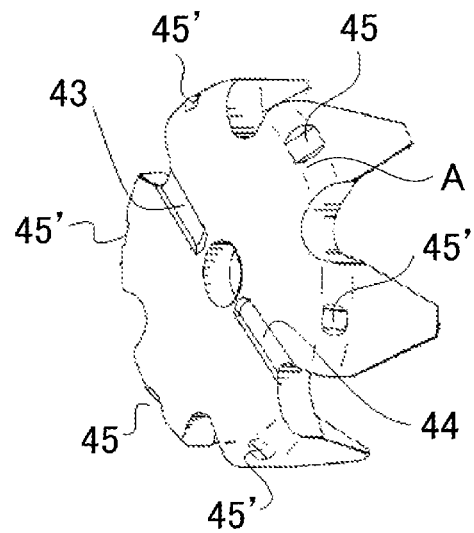
FIG. 5 is an oblique perspective view of the field-magnet core component according to Embodiment 2 of the present invention.

Firstly, the balance-correction concave portions 45, which are formed by the molding die, may have a shape in which a protrusion of the molding die is easily formed, and then, various shapes of the balance-correction concave portions 45 are considered. For example, although a pothole-shaped portion indicated in FIG. 3 and a slide-shaped portion indicated in an oblique perspective view of FIG. 5 are considered, the shape of the balance-correction concave portions 45 is not limited to the shapes of the pothole-shaped portion and the slide-shaped portion. Moreover, the balance-correction concave portions 45 can adopt a shape to which a wind noise, which is caused when the field-magnet core component 4 is rotated, is considered.

As a matter of course, a basal portion (shoulder portion "A") of the claw-shaped magnetic pole of the field-magnet core component 4, on which the balance-correction concave portions 45 is formed by the molding die, may be formed as a taper-shaped portion or a R-shaped portion, and each of shapes is not limited.

In the above-described case, although the two gutter-shaped concave portions 43 and 44 are diagonally arranged in a roughly diametrical direction and in series, for example, when the balance of the field-magnet core component 4 is considered, the component 4 may have a configuration in which the same gutter-shaped concave portions are formed in accordance with all valley-shaped portions 41 between the claw-shaped magnetic poles. In this case, it is estimated that the balance is more improved in comparison with the case in which two gutter-shaped concave portions 43 and 44 are formed. However, as described above, when the balance-correction concave portions 45 are formed at the basal portion (shoulder portion "A") of the claw-shaped magnetic pole in order to improve the balance of the two gutter-shaped concave portions 43 and 44, the balance-correction concave portions 45 are arranged at the roughly most outer circumference, so that there is an advantage in which shapes of the concave portions 45 are relatively downsized.

In this case, because the lead wires 6 are connected at the field-magnet core component 4 side, although the gutter-shaped concave portions 43 and 44 and the balance-correction concave portions 45 are formed only on the field-magnet core component 4, it is needless to say that the same portions can be formed on the field-magnet core component 3 in reference to a cost of the manufactured components which are commonly used.

Moreover, six claw-shaped magnetic poles are evenly arranged around the axis of the field-magnet core components 3 and 4, and two gutter-shaped concave portions are symmetrically formed with respect to the axis, so that the balance-correction concave portions 45 can be easily formed at positions which are separated from the gutter-shaped concave portions at a 90° angle. However, a number of the claw-shaped magnetic poles and the arrangement are not limited to this configuration, and, for example, when five claw-shaped magnetic poles are not evenly arranged in a state where the gutter-shaped concave portions are formed at two positions being deviated from a diagonal line, the claw-shaped magnetic poles can be ready for various configurations of magnetic poles, in which, for example, balance-correction concave portions are formed on the claw-shaped magnetic poles which are evenly nearest to the two positions in a circumferential direction.

Embodiment 2

Figure 4:
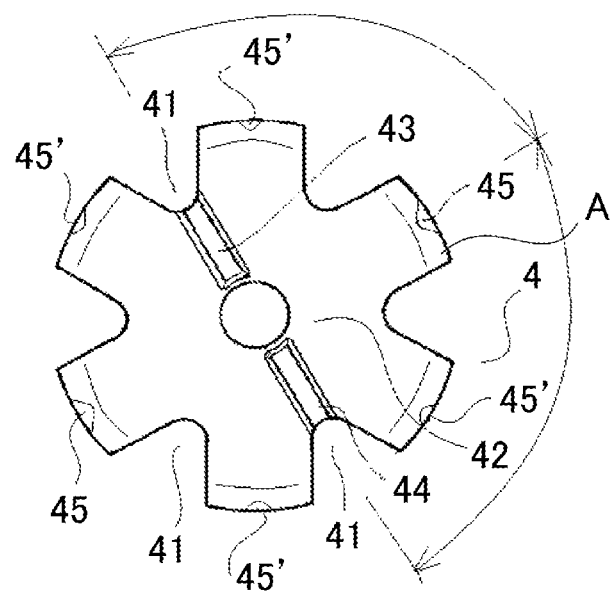
FIG. 4 is a side view of a field-magnet core component according to Embodiment 2 of the present invention.

FIG. 4 and FIG. 5 are a side view and an oblique perspective view of a field-magnet core component according to Embodiment 2 of the present invention. The field-magnet core component according to Embodiment 2 is different from the field-magnet core component according to Embodiment 1, and balance-correction concave portions, which are formed by a molding die, are provided on each of claw-shaped magnetic poles of the field-magnet core component. In other words, balance-correction concave portions 45 are formed at positions which are evenly separated (for example, separated at 90° angle) from gutter-shaped concave portions 43 and 44, and balance-correction concave portions 45', which are smaller than the balance-correction concave portions 45, are formed at the other positions. Thereby, a whole circumferential balance of the field-magnet core component is more improved. Because the small balance-correction concave portions 45' are formed, the field-magnet core component has a characteristic in which the balance-correction concave portions 45 can be formed without having an excessively large shape in comparison with a case in which the field-magnet core component is balanced only by the balance-correction concave portions 45.

Moreover, in Embodiment 2, the balance-correction concave portions are formed on all basal portions (shoulder portions "A") of the claw-shaped magnetic poles, so that the secondary balance correction explained in Background Art is cut. In other words, when single balance correction is performed, applicable portions can be processed by using the balance-correction concave portions, so that the claw-shaped magnetic poles can be stably processed. Specifically, when the basal portion (shoulder portion "A") of the claw-shaped magnetic pole, on which the balance correction is performed, is formed as an R-shaped portion, an initial contact of a cutting edge of a drill is not stable at a conventional correction process, and a consideration is required. However, the concave portions formed by the molding die are previously prepared, and the cutting edge can be inserted to the concave portions, so that a consideration is not required when the rotor is processed. Moreover, it is suggested that the balance-correction concave portions are used for positioning a tool when an imbalance correction of a rotor is processed, whereby the cutting edge is used in a more stable condition.

Figure 6:
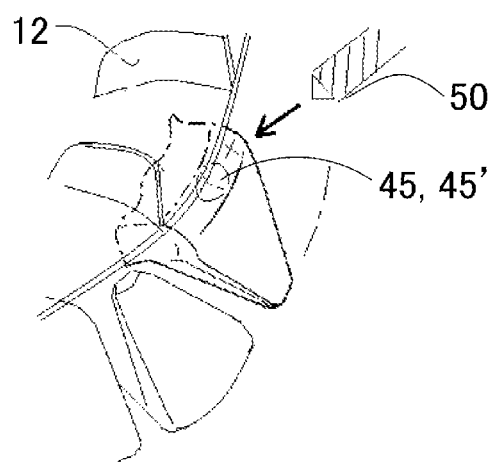
FIG. 6 is a schematic diagram for explaining a balance correction according to Embodiment 2 of the present invention.

FIG. 6 roughly indicates a condition in which a cutting edge of a drill 50 for correcting and processing the claw-shaped magnetic poles is inserted to the balance-correction concave portion 45 or 45' while the cutting edge avoids an attached fan 12. Moreover, when it is not required that the balance-correction concave portion is more processed, it is suggested that the illustrated drill 50 is exchanged to a positioning tool, and, for example, a processing target ("+" mark illustrated in FIG. 6), which is positioned at a right side of the balance-correction concave portion 45 or 45', is processed.

Embodiment 3

Figure 7:
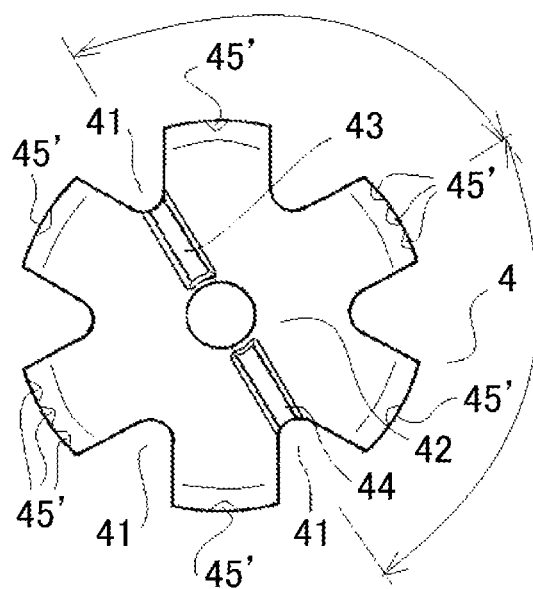
FIG. 7 is a side view of a field-magnet core component according to Embodiment 3 of the present invention.

Although one large or small balance-correction concave portion is formed on each of the shoulder portions "A" in the above-described Embodiment 2, FIG. 7 indicates an example in which a plurality of balance-correction concave portions having the same shape are formed. In other words, three balance-correction concave portions 45', which correspond to the large balance-correction concave portion 45 described in Embodiment 2, and one balance-correction concave portion 45', which corresponds to the small balance-correction concave portion 45' described in Embodiment 2, are formed in the same shape. In order to form the balance-correction concave portions, corresponding to a volume of gutter-shaped concave portions 43 and 44, at suitably and equally divided positions (10 positions in this case), the shape of the balance-correction concave portions is analyzed by, for example, a computer, and the analyzed shape can be applied to a molding die. When this configuration is applied to a rotor according to Embodiment 3, the concave portions, in which a single balance correction is performed, have the same shape at all claw portions, so that the processing step is more easily controlled in comparison with the rotor according to Embodiment 2. Moreover, the processed concave portions are distributed into a plurality of portions, so that a product can be obtained in which at least the balance-correction concave portions 45' can be downsized, and a cutting tolerance is wide when the product is processed.

What is claimed is:

1. A rotor of a rotary electric machine, comprising:
   a field-magnet coil for generating a magnetic flux;
   a pair of field-magnet core components which include a plurality of claw-shaped magnetic poles and support the field-magnet coil around a rotational shaft in such a way that the field-magnet coil is installed to an inner diameter side of the claw-shaped magnetic poles;
   a slip ring assembly which supplies a magnetic field current from the outside of the rotor to the field-magnet coil;
   a pair of lead wires which are led from the field-magnet coil to connect to the slip ring assembly; and
   a pair of gutter-shaped concave portions which are formed along a side surface positioned at the outside of an axis of the field-magnet core components so as to install and protect the pair of lead wires; wherein
   balance-correction concave portions formed by a molding die are provided at shoulders of the claw-shaped magnetic poles being nearest to positions which are evenly separated at least in a circumferential direction with respect to the pair of gutter-shaped concave portions, a volume and position of the balance-correction concave portions is configured to balance only a volume occupied by the pair of gutter-shaped concave portions.

2. A rotor of the rotary electric machine as recited in claim 1, wherein the gutter-shaped concave portions are provided at two positions in a substantially diametrical direction in a state where the rotary shaft is sandwiched by the gutter-shaped concave portions, and the balance-correction concave portions formed by the molding die are provided at two positions.

3. A rotor of the rotary electric machine as recited in claim 1, wherein the balance-correction concave portions formed by the molding die are provided at all shoulders of the plurality of claw-shaped magnetic poles, and the balance-correction concave portions, which are provided at shoulders of the claw-shaped magnetic poles being nearest to positions which are evenly separated in a circumferential direction with respect to the pair of gutter-shaped concave portions, are larger than the other balance-correction concave portions provided at the other shoulders.

4. A rotor of the rotary electric machine as recited in claim 1, wherein the balance-correction concave portions formed by the molding die are provided at all shoulders of the plurality of claw-shaped magnetic poles, and a plurality of balance-correction concave portions are provided only at shoulders of the claw-shaped magnetic poles being nearest to positions which are evenly separated in a circumferential direction with respect to the pair of gutter-shaped concave portions, and one balance-correction concave portion is provided at each of the other shoulders, and all balance-correction concave portions have a substantially identical shape.

5. A manufacturing method of the rotor of the rotary electric machine according to claim 1, wherein the balance-correction concave portions formed by the molding die are used for positioning a tool when an imbalance correction of the rotor is processed.

* * * * *